United States Patent
Short

(10) Patent No.: US 8,660,673 B2
(45) Date of Patent: Feb. 25, 2014

(54) IN-GAME CONTEXTUAL TELEMETRY SYSTEMS AND METHODS

(75) Inventor: Gregory T. Short, Carlsbad, CA (US)

(73) Assignee: Electronic Entertainment Design and Research, Carlsbad, CA (US)

(*) Notice: Subject to any disclaimer, the term of this patent is extended or adjusted under 35 U.S.C. 154(b) by 106 days.

(21) Appl. No.: 13/154,869

(22) Filed: Jun. 7, 2011

(65) Prior Publication Data

US 2012/0245715 A1  Sep. 27, 2012

Related U.S. Application Data

(60) Provisional application No. 61/466,680, filed on Mar. 23, 2011.

(51) Int. Cl.
*G06F 19/00* (2011.01)
(52) U.S. Cl.
USPC ............................... 700/91; 463/42; 463/43
(58) Field of Classification Search
USPC ........................................ 463/42, 43; 700/91
See application file for complete search history.

(56) References Cited

U.S. PATENT DOCUMENTS

| | | | |
|---|---|---|---|
| 7,500,916 B2 | 3/2009 | Lieberman et al. | |
| 7,632,186 B2 | 12/2009 | Spanton et al. | |
| 7,788,536 B1 | 8/2010 | Qureshi et al. | |
| 2002/0183111 A1 | 12/2002 | Emmerson et al. | |
| 2003/0040361 A1 | 2/2003 | Thorner | |
| 2006/0121989 A1* | 6/2006 | O'Kelley et al. | 463/42 |
| 2007/0072678 A1* | 3/2007 | Dagres | 463/42 |
| 2007/0117617 A1 | 5/2007 | Spanton et al. | |
| 2007/0117635 A1 | 5/2007 | Spanton et al. | |
| 2007/0173327 A1* | 7/2007 | Kilgore et al. | 463/42 |
| 2008/0096663 A1 | 4/2008 | Lieberman et al. | |
| 2008/0262786 A1 | 10/2008 | Pavlidis | |
| 2008/0288486 A1* | 11/2008 | Kim et al. | 707/5 |
| 2010/0283630 A1 | 11/2010 | Alonso | |
| 2012/0215617 A1* | 8/2012 | Shah et al. | 705/14.35 |

* cited by examiner

*Primary Examiner* — Dmitry Suhol
*Assistant Examiner* — Carl V Larsen
(74) *Attorney, Agent, or Firm* — Fish & Associates, PC

(57) ABSTRACT

A gaming analysis engine is presented. The analysis engine acquires gaming telemetry data representative of a game player's interactions with a game. The engine can compare the acquired telemetry data against known gaming contexts comprising disparate telemetry data sets or marketing performance data to determine if the telemetry data satisfies triggering criteria. When the triggering criteria are satisfies, the engine can trigger an event representing a signal that desirable information is available to a user or an action is to be taken.

28 Claims, 4 Drawing Sheets

IN-GAME CONTEXTUAL TELEMETRY SYSTEMS AND METHODS

This application claims the benefit of priority to U.S. provisional application having Ser. No. 61/466,680, filed on Mar. 23, 2011. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is electronic game analysis technologies.

BACKGROUND

Video games represent a significant monetary investment rivaling movie productions. Before a game developer commits to development, the developer would like to have some level of confidence their monetary investment will result in financial success. The Applicant's own work has made significant progress toward informing game developers of risks or benefits of their planned game as described in co-owned U.S. Pat. No. 7,580,853 to Short et al. titled "Methods of Providing a Marketing Guidance Report for a Proposed Electronic Game", filed Aug. 13, 2007. In the Applicants' approach, characteristics of a new game are compared to characteristics of known historical games to offer guidance to the developer as to which characteristics would likely be most desirable for inclusion in a game.

The Applicants have come to further appreciate that telemetry data obtained from a gaming device can also be compared against gaming contexts defined in terms of telemetry data of known games. Furthermore, the telemetry data can be compared to gaming contexts that include marketing performance data or metrics associated with known games. Although some effort has been directed to collecting telemetry data per se, others have failed to appreciate that telemetry data from one game can be compared to telemetry data from other, different games.

U.S. Pat. No. 7,778,536 to Qureshi et al. titled "Automated Detection of Problems in Software Application Deployments", filed Dec. 21, 2005, describes a system for monitoring software applications where an analysis engine detects potential problems. Although useful for detecting faults in software, Qureshi fails to provide insight into simply collecting telemetry data related to an electronic game.

To the extent the sports are games, U.S. patent application 2010/0283630 to Alonso titled "Sports Telemetry System for Collecting Performance Metrics and Data", filed May 3, 2010, discusses collecting telemetry data from an athlete playing a sport. Unfortunately, Alonso fails to provide insight into collecting telemetry data across multiple games, let alone multiple gaming contexts.

U.S. patent application publication 2008/0262786 to Pavlidis titled "Non-Exercise Activity Thermogenesis (NEAT) Games as Ubiquitous Activity Based Gaming", filed Apr. 21, 2008, describes acquiring a game participant's telemetry data, but fails to appreciate the value of the telemetry data as compared to known contexts.

U.S. Pat. No. 7,632,186 to Spanton et al. titled "Spectator Mode for a Game", and U.S. patent application publication 2007/0117635 also to Spanton et al. titled "Dynamic Spectator Mode", both filed Nov. 21, 2005, describes receiving telemetry data of a game player playing a game and re-broadcasting the telemetry data to spectators. Interestingly, the spectators can submit feedback, but the disclosed system fails to offer any indication of how the game play compares to other games in general.

U.S. Pat. No. 7,500,916 to Lieberman et al. titled "Strategy Analysis Tool Generating a Two Dimensional Image Overlaid with Telemetry Data", filed Nov. 7, 2005, describes further progress in evaluating gaming telemetry data. Lieberman allows users to review their game sessions from a statistical stand point. Still, Lieberman also fails to appreciate that telemetry data from a game can be compared to different games.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

It has yet to be appreciated that telemetry data from known games can be aggregated into a data warehouse as known gaming contexts, especially where contexts can represent disparate telemetry data sets. The gaming contexts can also be stored according to a normalized taxonomy to allow for ease of comparison from one telemetry data set to another. When current telemetry data satisfies criteria relative to the known gaming contexts, an event can be triggered to surface insights on the relationship between the two sets of data. Developers, or other entities involved with game production or distribution, can leverage the events to gain insight into market performance of an existing game or a game to be deployed.

Thus, there is still a need for gaming analysis engines capable of comparing telemetry data of a current game to telemetry data of other known games.

SUMMARY OF THE INVENTION

The inventive subject matter provides an apparatus, systems and methods in which one can leverage a gaming analysis engine to determine how a game player's interactions compare to other known gaming contexts which can include gaming contexts related to historical performance of other games in a market place. One aspect of the inventive subject matter includes a gaming analysis engine. Contemplated engines comprise a gaming device interface through which the analysis engine is able to obtain telemetry data representing the player's interactions with an electronic game on a gaming device. A telemetry engine compares the telemetry data to known gaming contexts stored in a context database. The known gaming contexts preferably represent disparate telemetry data sets of gamer interactions across multiple other electronic games. The context database preferably stores the known contexts in terms of a normalized telemetry namespace or taxonomy to allow for easy comparison of contexts to other normalized objects in the system. If the telemetry engine determines that the telemetry data satisfies triggering criteria relative to the known contexts, the telemetry engine presents the event to a user by suitably configuring an event interface possibly operating as a display device.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer/server based gaming analysis engine, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including providing a gaming analysis infrastructure capable of aggregating telemetry data from multiple game devices and causing an action to be generated on a remote computing device when event triggering criteria is satisfied by the aggregated telemetry data.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
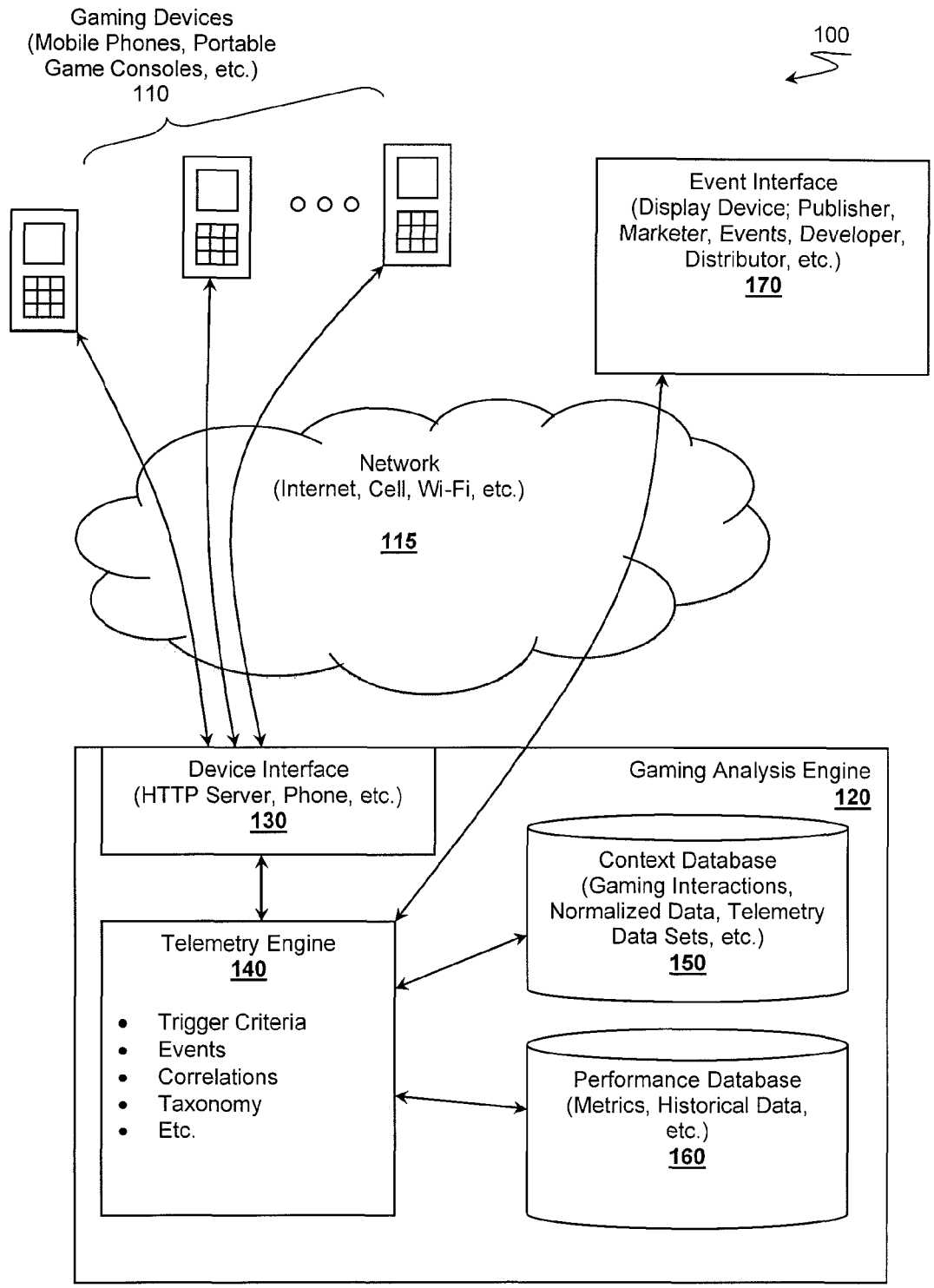
FIG. 1 is a schematic overview of a gaming analysis engine environment.

In FIG. 1, gaming environment 100 comprises gaming analysis engine 120. Gaming analysis engine 120 monitors gaming telemetry data from one or more electronic gaming devices 110. Analysis engine 120 comprises device interface 130 through which it obtains the telemetry data. In the example shown device interface 130 is illustrated as an HTTP server. Analysis engine 120 further includes telemetry engine 140 capable of analyzing incoming gaming telemetry data relative known gaming contexts stored in context database 150. Gaming contexts can comprise one or more disparate telemetry data sets, historical data sets, current data sets, play test sets, or other types of telemetry data sets. One should appreciate that the gaming contexts can comprise information from many different electronic games, even games spanning across multiple genres, languages, gaming platforms, or other market spanning characteristics. Although illustrated as stored in separate performance database 160, the gaming contexts can also comprises market performance metrics or data. Analysis engine 120 can also compare the gaming telemetry data to marketing performance data to establish correlations or causations between interactions represented by the telemetry data and the market performance metrics. When the telemetry data satisfies established triggering criteria, analysis engine 120 can cause an event to occur (e.g., action, notification, report, etc.) where event information can be presented to a user via user interface 170. For example, analysis engine 120 provides instructions to configure interface 170 to present event related information.

Analysis engine 120 obtains the gaming telemetry data via gaming device interface 130. In the example shown, gaming device interface 130 comprises a telemetry server remote from gaming devices 110 over network 115. For example, gaming device interface 130 can include an HTTP server offering access to one or more web-service APIs or URLs through which gaming devices 110 submit their telemetry data. In other embodiments, gaming devices 110 comprise gaming device interface 130 as discussed with reference to FIG. 2 below.

Analysis engine 120 obtains the telemetry data through one or more different possible acquisition schemes. In some embodiments gaming devices 110 push the telemetry data to telemetry engine 140 within gaming analysis engine 120. In other embodiments, telemetry engine 140 can pull the telemetry data from gaming devices 110 via electronic gaming device interface 130. Telemetry engine 140 can include one or more tables listing identifiers (e.g., URLs, network address, IP address, cell phone numbers, etc.) which can be used to poll gaming devices 110 for the telemetry data. A push-based acquisition system is considered more advantageous because such a system allows users greater control over how their respective gaming devices 110 behave when playing a game.

Regardless of a push or pull approach, the telemetry data can be obtained in substantially real-time as gaming devices 110 generate the telemetry data. As a game player interacts with the game, gaming devices 110 can submit interaction information as the interactions occur. It is also contemplated that telemetry engine 140 obtains the telemetry data in batch mode. For example, a gaming device 110 might loose connectivity with network 115 causing gaming device 110 to log telemetry data in an internal or local memory (e.g., flash, RAM, HDD, SSD, etc.). When connectivity is restored, the telemetry data can be transmitted to telemetry engine 140 en masse.

Analysis engine 120 preferably has access to context database 150 storing known gaming interaction contexts representing game player interactions for other electronic games, even games spanning across multiple genres, publishers, platforms, telemetry data sets, or other dimensions of relevance. Known contexts can be defined in terms of telemetry data stored according to a normalized telemetry taxonomy representing a common namespace or concept space through which disparate telemetry data sets can be compared or evaluated. The normalized taxonomy can be presented to a developer during development of a game to allow the developer to select desired telemetry data or objects that can be bound to game related or user related events.

As referenced previously, a known context can also include game marketing performance data comprising market performance metrics of other known games. The marketing performance data can be stored in separate performance database 160 as illustrated or can be integrated within context database 150. Preferably the marketing performance data is also stored according to a normalized taxonomy, possibly related to the taxonomies used for the known context data sets so that telemetry data and marketing performance data can be correlated easily. Such an approach allows for easy comparison between the various objects associated with the performance data or telemetry data.

Telemetry engine 140 monitors incoming telemetry data relative to the known context to determine if an action should be taken. The incoming telemetry data can be evaluated based on many various levels of granularity. The telemetry data can be evaluated on an interaction event basis, on a player basis, on a statistical basis across multiple players and devices, or on a game session basis. Furthermore, telemetry data can be aggregated from multiple, different games having a common characteristic, or other form of aggregated telemetry data. Thus, the telemetry data can be evaluated from a fine level granularity up through an aggregated level spanning across platforms; games, devices, players, or other types of factors.

Figure 2:
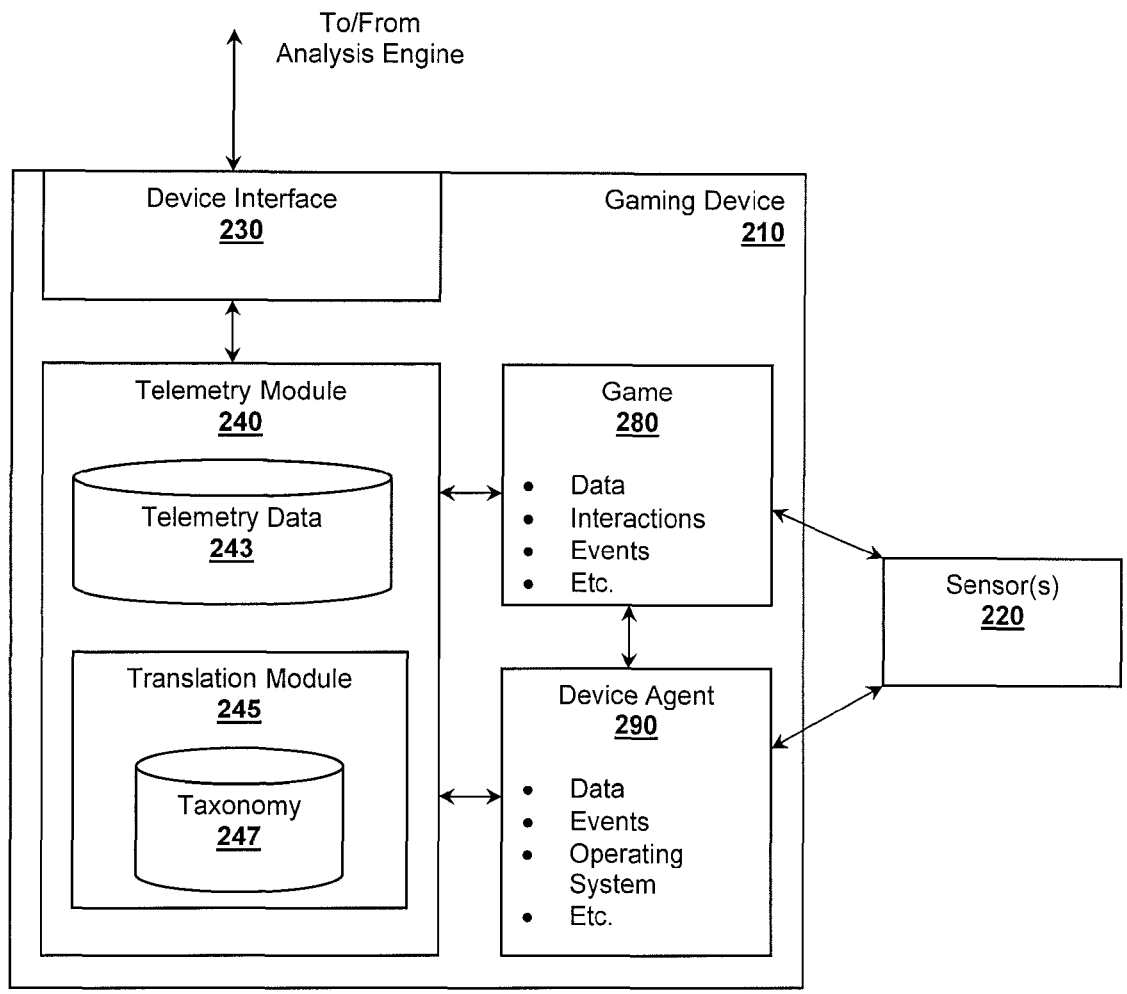
FIG. 2 is a schematic of an electronic gaming device instrumented with a telemetry module.

FIG. 2 presents a schematic of gaming device 210. Gaming device 210 can be considered one type of gaming device from a broad spectrum of computing devices. More preferred gaming devices 210 comprise mobile phones operating as a gaming platform (e.g., Driod®, iPhone®, etc.). Other gaming devices can include game consoles (e.g., Xbox®, PS3®, Wii®, etc.), hand-held devices (e.g., Nintendo DS, PSP, etc.), portable computers (e.g., iPad®, XOOM®, etc.), appliances (e.g., TV, set to boxes, etc.), web-enabled device (e.g., a browser supporting FLASH™), or other suitably configured computing devices. Gaming devices 210 preferably comprise a network connection, wired or wireless, through which gaming telemetry data can be exchanged over network 115 (e.g., Internet, WLAN, Wi-Fi, WiGIG, Bluetooth, USB, WiMAX, cell, etc.).

In the example shown gaming device 210 includes device interface 230 through which gaming device 210 and a gaming analysis engine can interact. Device interface 230 can comprise a communication module or communication stack capable of addressing the analysis engine over a network. In some embodiments, the communication module, or other components, takes the form of a callable library of modules offered by a service providing access the game analysis engine. The library can be integrated with the game, game device operating system, drivers, or other aspects of the system. One should appreciate that device interface 230 is also considered to include one or more physical communication ports (e.g., wired ports, wireless ports, etc.) through which gaming device 210 exchanges data with the remote analysis engine.

Gaming device 210 is preferably configured to present an instance of electronic game 280. As a user plays electronic game 280, the user clearly interacts with game 280. In more preferred embodiments, telemetry module 240 collects data relating to the user-game interactions. In the example shown, telemetry module 240 is illustrated as a separate component from game 280 where telemetry module 240 monitors activity within game 280 or device behaviors via device agent 290. In other embodiments, one or more telemetry modules 240 can be integrated within game 280, possibly as a callable library provided by the game analysis service provider.

Device agent 290 represents a component through which telemetry module 240 can acquire non-game related telemetry. Non-game related telemetry comprises device-centric data about a user's interactions with gaming device 210, which might or might not have indirect impact on game 280. Furthermore, the non-game related telemetry can include sensor data collected from sensors 220 communicatively coupled with device 210. Examples of sensors 220 include sensors integrated with device 210 (e.g., camera, microphone, accelerometers, magnetometer, GPS, etc.) or external sensors distinct from device 210 that are coupled via a wired or wireless connection. For example, external sensors could include temperature sensors, bio-medical sensors, or other types of sensors.

Telemetry data 243 can be considered to comprise metadata relating to a game player's interactions with game 280 running on electronic gaming device 110. In some embodiments, the electronic game 280 comprises telemetry module 240 as discussed above, which monitors user-game interaction events, converts the user-game interaction event into telemetry data packets, and presents telemetry data 243 to gaming device interface 230, which in turn forwards telemetry data 243 on to the analysis engine.

Interactions can be considered to include direct interactions with game 280 or indirect interactions with game 280. Direct interactions comprise the user interacting directly with a game element; user interface, fire a weapon, open a door, move across a landscape, or other type of interaction. Direct interaction telemetry data 243 can also include a running log (e.g., position, orientation, time stamps, etc.) of the player's session. Indirect interactions comprise non-game related activities that could indirectly affect game 280. Examples of indirect interactions include receiving a phone call, real-world position or real-world location information related to the gaming device when game 280 is played, or other non-game stimuli that could affect a player's interactions with game 280. The telemetry data can reflect any instrumented or observable interaction as desired.

Consider a smart phone operating as game device 210. A game developer creates game 280 by purchasing access to one or more analysis engine modules, including telemetry module 240. The developer integrates telemetry module 240 into game 280 where telemetry module 240 converts telemetry event data into telemetry objects. The objects can be instantiated within game 280 or external to game 280 depending on the type of telemetry data 243 to be acquired (e.g., direct interactions, indirect interactions, sensor data, identification data, etc.). In such an embodiment, gaming device 210 can be considered to operate as a gaming device interface. Still, telemetry module 240 could be external to the gaming device, yet still local to the gaming device. For example, gaming device 210 could include a hand-held device, a PSP for example, which communicates via Bluetooth to a smart phone operating as gaming device interface 230. The smart phone operates as a telemetry hub and forwards telemetry data 243 on to the analysis engine.

In yet other embodiments, game 280 might comprise a legacy game deployed before availability of the telemetry analysis service where the legacy game lacks an understanding of a preferred telemetry data format. To address such an issue, or other issues, the gaming analysis engine environment can include translation module 245. Translation module 245 is illustrated as a component of gaming device 210, although translation module 245 could also be integral with the gaming engine of FIG. 1. Translation module 245 can be configured with rules or algorithm to convert interaction data obtained from game 280 or device agent 290 into a telemetry data 243. The rules for conversion are represented by taxonomy 247, which can include a definition of a common telemetry namespace or other normalized namespace.

Taxonomy 247 preferably comprises a uniform namespace of attributes, values, units, names, or other characteristics used to define telemetry data or data sets. One example includes a hierarchal namespace where each type of data item or object can include a name within the namespace and can include normalized attributes. For example, a phone ring event might be stored as an object having a name "phone.ring" and have normalized attributes of "Callee", "Caller", "Time", or other attributes with corresponding values. Use of such normalized namespaces and attributes allows for comparing telemetry data sets across gaming platforms, games, genres, game distribution channels, publishers, or other aspects. Taxonomy 247 can also provide rules for converting obtained data in a proprietary format into the normalized formats. Once the current telemetry data 243 is obtained, and possibly converted to a proper structure, telemetry data 243 can also be archived in the context database for future use. Thus, the context database continues to grow through use.

One should also appreciate that taxonomy 247 could also encompass non-telemetry information. For example, taxonomy 247 could include a namespace describing marketing performance metrics. Although more relevant within the gaming analysis engine context, one should appreciate that marketing metrics can also be acquired from gaming device 210. A user might wish to purchase electronic game 280, which can be quantified as a transaction interaction according to taxonomy 247. Although taxonomy 247 is illustrated as a single item, taxonomy 247 could comprise multiple normalized namespaces as desired; a game related namespace, a device related namespace, a marketing performance namespace, or other types of normalized namespaces.

Figure 3:
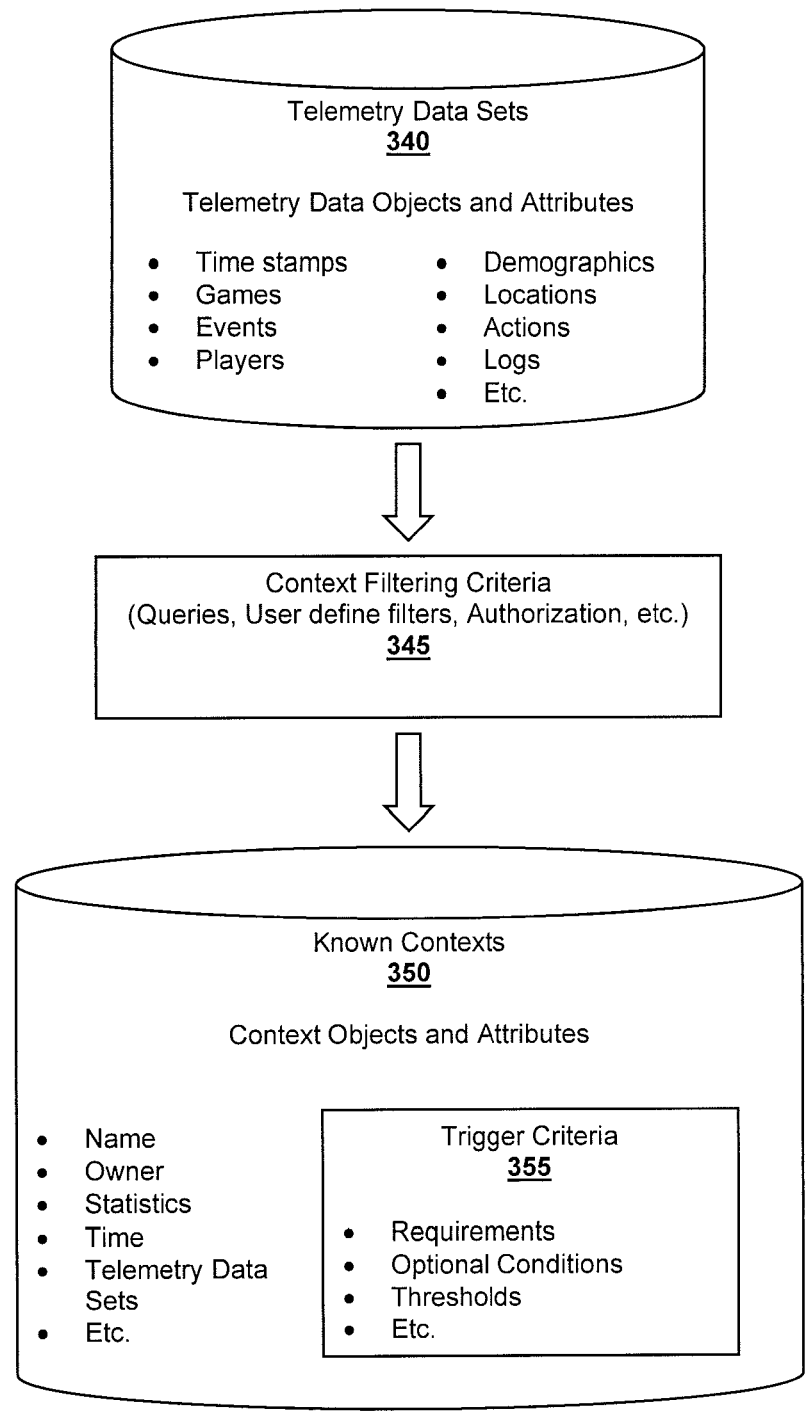
FIG. 3 presents an outline for defining a known game interaction context based on telemetry data sets.

FIG. 3 outlines a flow for defining one or more known contexts 350. One should appreciate that a context can be considered a data set comprising telemetry data or marketing data related to many other, different games where the context can be generated via filtering criteria.

Telemetry data sets 340 represents historical telemetry data obtained from many different gaming devices, games, publishers, developers, or other factions of the gaming industry. The telemetry data can be stored as telemetry objects, each object having one or more attributes conforming to a preferred common namespace. Telemetry objects can be managed individually or collectively according to the namespace. For example, telemetry objects associated with a single game release, "Zombie Ponies 3, version 2.13.0023, Build 2011-05-03.44", can be bound together by their common attributes. The analysis engine can provide one or more telemetry data sets based on desired criteria submitted by a user. The resulting data set can be used to generate statistics or for further analysis. Although telemetry data sets 340 are presented as telemetry data, one should appreciate the same techniques can be applied to marketing data sets (not shown).

A user, or other authorized entity, can submit filtering criteria 345 to the analysis engine or telemetry database storing telemetry data sets 340. The database searches for, or otherwise identifie, telemetry objects satisfying the filter criteria 345. Filter criteria 345 can be submitted according to many different schemes. In some embodiment, filter criteria 345 can include a Boolean logic attributes-based query identifying desirable telemetry object based on the normalized namespace or taxonomy. In some scenarios filter criteria 345 can include a natural language query. While yet in additional embodiments, filter criteria 345 could include recommendations generated by the gaming analysis engine.

Consider a developer who wishes to compare telemetry of their recently released game against commercially successful games. The developer could submit filter criteria 345 comprising the following requirements: a specified genre, a required high game review rating (e.g., at least four stars out of five), and a game platform (e.g., Droid). In response, the system returns a collection of telemetry data sets from a wide range of games matching the specified criteria. The relevant telemetry data sets can also include the marketing performance metric associated with the games. The collection is considered to represent defined known context 350. As the developer's game submits telemetry data, the telemetry data can be compared against the developer's defined context 350, and by association the marketing performance metrics.

Known contexts 350 can represent a data set comprising telemetry data or marketing data for a specific segmentation of the available data sets; possibly filtered according to a specific demographic, a specific geographic platform, or other segmentation criteria applied to telemetry or marketing data sets. Known contexts 350 can be stored as a context object having one or more attributes describing the context. Example attributes can include a name of the context, an owner, compiled or measured statistics, time stamps, pointers to other contexts, or other properties. Preferably, known contexts 350 have an associated triggering criteria 355 comprising requirements or optional conditions under which the telemetry engine will generate an event.

The telemetry engine generates an event by identifying when the obtained telemetry data satisfies triggering criteria 355 relative to known contexts 350. As discussed above with respect to generating filtering criteria 345 for known contexts 350, triggering criteria 355 can also be defined by a user of the system, or can be automatically generated. Consider a scenario where a developer wishes to gain insight into how players on a mobile phone react to phone calls while playing the developer's game. The developer can define filtering criteria 345 that generates a context of all smart phone games across many genres. The developer further defines triggering criteria 355 where incoming telemetry data must have an interaction event of a phone call coming in while the player is playing the developer's game. The telemetry data can include the number of rings before the player stops or interrupts the game. The telemetry engine can then compare the telemetry data, possibly aggregated across many players or devices, against triggering criteria 355 of known context 350 to determine how the developer's game compares to the industry in general. Perhaps, the number of rings for the developer's game indicates how engaging the game is for players. A large number of rings relative to the industry average or spread might indicate a more engaging game. In view of such an approach, the telemetry engine can also determine the telemetry data's satisfaction level of a triggering relative to the known context. The satisfaction level could include "not satisfied", "below a threshold", "at a threshold", or "above a threshold" where the threshold could be an industry average, among other statistics, for example.

The telemetry engine can be further configured to analyze known telemetry data relative to the historical marketing performance data to establish correlations, or possibly causations, among the known telemetry data and marketing performance data. If correlations are established, the telemetry engine can determine if the correlations relate to the incoming telemetry data. The event triggering criteria 355 can be defined to depend on the correlations, including those that are already known, or yet to be identified by the telemetry engine. In such scenarios, a game developer, or other party, gains insight into a likelihood that their game is or will conform to known success, or even known failures. Marketing performance data can include a wide variety of market related information possibly including sales performance, consumer opinion, a review rating, an editorial article, a survey result, a monetary value, a demographic, or other external data.

When the telemetry engine identifies an event, the telemetry engine presents the event or its related event information to a user. The nature of the presentation of the event depends on the type of event. For example, an event could comprise a notification or generation of a report, which can be presented via a remote web browser client as represented by the event interface in FIG. 1. Events can extend beyond a notification or generation of a message, possibly including a recommendation, a correlation, a causation, a game or feature classification, or other types of events. A causation can be considered to comprise interaction events that give rise to specific correlations. In view that the gaming analysis engine monitors or evaluates current telemetry data relative to known disparate telemetry data sets; the telemetry engine can also indicate how to classify a game or a feature.

Figure 4:
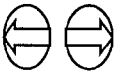
FIG. 4 is a schematic of a possible telemetry user interface.

FIG. 4 presents a schematic of a possible interface through which users or subscribers of the gaming analysis service can interact with the gaming analysis engine. Interface 400 is presented as a web browser interface for discussion purposes. Interface 400 could also comprise a cell phone interface, a dedicated application, or other type of interface. Interface 400 includes an area for context definition 410 where a user can define one or more contexts. Additionally interface 400 includes an area where events 430 can be presented. One should appreciate that presented interface elements can be presented separately, individually, or otherwise rearranged as desired.

Context definition 410 represents an area of interface 400 where a user is able to define one or more aspects of a context. In the example shown, a user submits a query string representing one portion of context filter criteria that requires the result set to comprise telemetry data set from science fiction games and played by males. The user has also named the context, unoriginally, "My Context". In some embodiments, the analysis engine can offer one or more suggestions or recommendations on how to define the context. For example, the user can select telemetry data sets that are available to the user, possibly based on authentication, authorization, subscriber fees, or other parameters. In a similar vein the user can select possible interactions considered relevant to the context.

The analysis engine has access to a great wealth of historical information including previously collected telemetry data as well as marketing performance data associated with corresponding games. In some embodiments, the analysis engine is configured to establish correlations among telemetry objects attributes and marketing performance metrics. The correlations allow the engine to generate one or more recommendations that could be used to select filter criteria. In the example shown, the user requires the genre of science fiction. The analysis engine can consult the marketing performance data to determine which type of game (e.g., real-time strategy, turn-based, first person shooter, role-playing, etc.) is most correlated with the genre selected, possibly based on a marketing performance metric, perhaps revenue generated from the male demographic.

The filter criteria preferably comprise criteria defined in terms of one or more normalized namespaces. Interface 400 can aid the user by offering suggestions on which elements of the namespace can be used, or can aid in translating the user's queries or requests into the normalized namespace.

Trigger criteria 420 represents an area of interface 400 where a user is able to define event triggering criteria. As with other aspects of the contemplated systems or methods, trigger criteria 420 can be defined in terms of normalized namespaces. The example provides two main examples. Interactions have a namespace where attributes of interacting objects are named based on a hierarchy. Games also have a namespace. In the example illustrated, the user has defined trigger criteria 420 to required that an event should be triggered under the following requirements: when the number of males interacting with the game exceed the average derived from the context AND when the interactions include at least twice as many rings of the player's cell phone relative to the average of the context AND when the game download exceed 10000 instances AND where the game's name is "Zombie Ponies 3". It is also contemplated that triggering criteria 420 could depend on other trigger criteria or events.

Additional event information can also be defined by the user as desired. Additional event information can include an event name, presentation parameters (e.g., text, email, graphics, etc.), executable instructions (e.g., compile statistics, spreadsheets, database, etc.), event recipients, or other information. When the event is trigger, the analysis engine can provide the event information to the recipients.

Events 430 represent an area of interface 400 where event information is presented when an event is triggered. The user has decided that the event information should be presented as a spreadsheet outlining event statistics versus statistics compiled across the known context. User interface 400 has been instructed to present compiled statistics across all telemetry events satisfying triggering criteria 420. For example, the average number of rings before a user pauses the game is three rings, while the same statistic for the comparative context was two rings. The user might assume that their game is more engaging than those in the defined context. The event information can also include a comparison on current marketing performance metrics relative to those of the defined context.

One should appreciate that an event can have a level of satisfaction to the triggering criteria as mentioned previously. The level of satisfaction can be based on an individual telemetry event where the level is calculated based on the degree to which the event corresponds to the triggering criteria. For example, triggering criteria 420 could include optional conditions, or a weighted criterion. When the event is generated, the number of matching conditions or weighting factors can be converted in to a numerical satisfaction as desired. Furthermore, the level of satisfaction can be calculated from statistics across multiple telemetry data points satisfying triggering criteria 420. When optional conditions are present, portions of the telemetry data points might not satisfy all optional conditions. In such embodiments, the event information can include statistics indicating the number of telemetry data points do or do not satisfy triggering criteria 420.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A gaming analysis engine comprising:
a computer readable storage medium;
an electronic gaming device interface having a communication port configured to acquire non-game related telemetry data representative of a gamer interacting with an electronic game on a gaming device;

a context database stored on the computer readable storage medium, wherein the context database stores known non-game related interaction contexts from a plurality of other electronic games and known market performance data from the plurality of other electronic games, the non-game related interaction contexts defined in terms of normalized telemetry data; and a telemetry engine coupled with the interface and with the database and configured to:

obtain the non-game related telemetry data from the electronic gaming device interface;

identify a first event that satisfies a triggering criteria, wherein the triggering criteria is defined as a function of the non-game related telemetry data, the known non-game related interaction contexts, and the known market performance data; and instruct a telemetry interface to present the first event.

2. The engine of claim 1, the electronic gaming interface comprises at least one of the following: (a) a telemetry module local to the gaming device and (b) a telemetry server remote from the gaming device.

3. The engine of claim 1, wherein the electronic gaming interface is further configured to push the non-game related telemetry data to the telemetry engine.

4. The engine of claim 1, wherein the electronic the telemetry engine is further configured to pull the non-game related telemetry data via the electronic gaming interface.

5. The engine of claim 1, wherein the telemetry engine obtains the non-game related telemetry data in real-time.

6. The engine of claim 1, wherein the non-game related telemetry engine obtains the telemetry data in batch.

7. The engine of claim 1, wherein the gaming device comprises at least one of the following devices: a mobile device, an appliance, and a web-enabled device.

8. The engine of claim 1, wherein the telemetry engine comprises a translation module configured to convert the non-game related telemetry data to the normalized taxonomy.

9. The engine of claim 1, further comprising a developer's interface configured to present the normalized taxonomy during the creation of traceable events within the electronic game.

10. The engine of claim 9, wherein the telemetry engine is further configured to store the non-game related telemetry data as a new known context within the context database according to the normalized taxonomy.

11. The engine of claim 1, wherein the triggering criteria depends on aggregated telemetry data from the known interaction contexts.

12. The engine of claim 11, wherein the event comprises a satisfaction level of the triggering criteria.

13. The engine of claim 1, wherein the known contexts comprises disparate telemetry data sets.

14. The engine of claim 1, wherein the gaming device comprises the electronic gaming device interface.

15. The engine of claim 1, wherein the event comprises at least one of the following: a report, a notification, a recommendation, a correlation, a causation, and a classification.

16. The engine of claim 1, wherein the non-game related telemetry data comprises data collected from a sensor communicatively coupled with the electronic gaming device.

17. The engine of claim 16, wherein the sensor is selected from the group consisting of a camera, a microphone, an accelerometer, a magnetometer, a GPS device, a temperature sensor, and a bio-medical sensor.

18. The engine of claim 1, wherein the non-game related telemetry data comprises device-centric data about the gamer's interactions with the gaming device.

19. The engine of claim 1, wherein the non-game related telemetry data comprises indirect interactions that indirectly affect a game running on the gaming device.

20. The engine of claim 1, wherein the communication port is configured to acquire game related telemetry data, wherein the context database stores known game related interaction contexts representing interactions from a plurality of other electronic games, the game related interaction contexts defined in terms of normalized telemetry data, and wherein the telemetry engine is configured to:

obtain the game related telemetry data from the electronic gaming device interface, identify a second event that satisfies a second triggering criteria, wherein the second triggering criteria is defined as a function of the game-related telemetry data, the known game-related interaction contexts, and the known market performance data, and instruct a telemetry interface to present the second event.

21. The engine of claim 20, wherein the non-game related telemetry data comprises data relating to the gamer's interactions with the gaming device and the game related telemetry data comprises metadata relating to the gamer's interactions with a game running on the gaming device.

22. The engine of claim 20, wherein the telemetry engine is configured to identify a correlation between the non-game related telemetry data and the game-related telemetry data.

23. The engine of claim 20, wherein the telemetry engine is configured to identify a causation between the non-game related telemetry data and the game-related telemetry data.

24. The engine of claim 1, further comprising a user interface coupled to the telemetry engine configured to receive a definition of the triggering criteria from a game developer and present the first event to the game developer.

25. The engine of claim 24, wherein the user interface is further configured to receive a definition of the non-game related telemetry data from the game developer.

26. The engine of claim 24, wherein the user interface is further configured to recommend at least one definition of the non-game related telemetry data to the game developer.

27. The engine of claim 26, wherein the recommendation is generated using a derived correlation between the known non-game related interaction data and the marketing performance data.

28. The engine of claim 1, wherein the market performance data is selected from the group consisting of: sales performance, customer opinion, a review rating, an editorial article, a survey result, a monetary value, and a demographic.

* * * * *